(12) United States Patent
Shevlin (10) Patent No.: US 9,416,541 B2
(45) Date of Patent: Aug. 16, 2016

(54) FIXTURE SUPPORT FOR MEMBRANE ROOF (71) Applicant: William Edwin Shevlin, Santa Cruz, CA (US)

(72) Inventor: William Edwin Shevlin, Santa Cruz, CA (US)

(73) Assignee: Renewable Elements, LLC, San Jose, CA (US)

( * ) Notice: Subject to any disclaimer, the term of this patent is extended or adjusted under 35 U.S.C. 154(b) by 0 days.

(21) Appl. No.: 14/974,266

(22) Filed: Dec. 18, 2015

(65) Prior Publication Data
US 2016/0102458 A1 Apr. 14, 2016

Related U.S. Application Data (62) Division of application No. 14/264,331, filed on Apr. 29, 2014, now Pat. No. 9,238,914.

(51) Int. Cl.
| | |
|---|---|
| *E04B 1/00* | (2006.01) |
| *E04G 21/00* | (2006.01) |
| *E04G 23/00* | (2006.01) |
| *E04D 13/00* | (2006.01) |
| *E04D 5/14* | (2006.01) |
| *E04D 5/06* | (2006.01) |
| *E04D 1/34* | (2006.01) |

(52) U.S. Cl.
CPC *E04D 13/00* (2013.01); *E04D 5/06* (2013.01); *E04D 5/143* (2013.01); *E04D 5/144* (2013.01); *E04D 5/149* (2013.01); *E04D 1/34* (2013.01); *E04D 5/14* (2013.01); *E04D 13/008* (2013.01)

(58) Field of Classification Search
CPC ........... E04D 5/149; E04D 5/144; E04D 5/14; E04D 1/34; E04D 5/00
USPC .............. 52/741.15, 746.11, 745.21, 698, 25, 52/741.1; 248/237, 200; 182/45
See application file for complete search history.

(56) References Cited

U.S. PATENT DOCUMENTS

| | | | | |
|---|---|---|---|---|
| 4,581,863 | A * | 4/1986 | Thaler | E04D 13/1407 248/354.3 |
| 6,688,047 | B1 * | 2/2004 | McNichol | E04D 13/10 52/25 |
| 8,181,398 | B2 * | 5/2012 | Stearns | E04D 13/10 52/173.1 |
| 8,683,751 | B2 * | 4/2014 | Stearns | E04D 13/10 52/173.1 |
| 8,857,108 | B2 * | 10/2014 | Smeja | E04D 13/10 52/24 |
| 9,238,914 | B2 * | 1/2016 | Shevlin | E04D 5/149 52/409 |
| 2005/0102958 | A1 * | 5/2005 | Anderson | E04D 13/10 52/698 |
| 2011/0240207 | A1 * | 10/2011 | Stanley | E04D 13/1407 156/91 |
| 2013/0009025 | A1 * | 1/2013 | Stearns | E04D 13/10 248/237 |
| 2013/0305622 | A1 * | 11/2013 | Smeja | E04D 13/10 52/26 |

* cited by examiner

*Primary Examiner* — Ch Q Nguyen
(74) *Attorney, Agent, or Firm* — Donald R. Boys; Central Coast Patent Agency, Inc.

(57) ABSTRACT

A method for supporting one or more fixtures on a membrane-covered roof comprises steps of (a) forming one or more brackets coated each on at least one surface with a material compatible for heat welding to roofing membrane, (b) cutting a piece of roofing membrane, separate from the membrane of the membrane-covered roof, the cut piece of roofing membrane having a length and width substantially greater than dimensions of the one or more brackets, (c) joining the one or more brackets by heat welding to the cut piece of roofing membrane, leaving substantial overhanging projection of the cut piece of roofing membrane from the one or more bracket in every direction from the one or more brackets, and (d) heat welding the cut piece of roofing membrane to the membrane of the membrane-covered roof, thereby securing the one or more brackets to the membrane-covered roof.

5 Claims, 5 Drawing Sheets

FIXTURE SUPPORT FOR MEMBRANE ROOF

CROSS-REFERENCE TO RELATED DOCUMENTS

The present application is a divisional application of pending application Ser. No. 14/264,331, filed on Apr. 29, 2014, and all disclosure of the prior application is incorporated herein at least by reference.

BACKGROUND OF THE INVENTION

1. Field of the Invention

The present invention is in the field of construction and pertains particularly to methods and apparatus for supporting fixtures on a membrane roof.

2. Discussion of the State of the Art

In the field of construction, particularly roofing, membrane roofing as it is known in the art is becoming a staple for certain roof systems that formerly would be covered in asphalt and or roof tar. Membrane roofing panels are typically available in sheets or rolls that may be cut to length and that may be secured to an unfinished roof surface, and heat welded together to form a unitary membrane.

Although there are a variety of membrane roofing materials available, more common compositions include Polyvinyl Chloride (PVC), Ketone Ethylene Ester (KEE), Chloro-Sulfonated Polyethlene (CSPE), Ethylene Propylene Diene Monomer (EPDM) and Thermoplastic PolyOlefin (TPO). Membrane roofing sheets may be mechanically fastened through the membrane with a screw, pin type fastener or other mechanical means un-finished roof with an overlapping edge of an adjacent sheet heat welded over the fastened line to cover and seal the fastener. Membrane roofs can also be adhered using a variety of adhesives by applying adhesive to the existing roof substrate, insulation, fire proof roof board or unfinished roof substrate. The exposed seams of the membrane are then heat welded to create a solid membrane out of the panels or rolls. Heat welding the panels together involves a surface-to-surface heating and fusion of the interfacing surfaces of adjacent panels or sheets, requiring a certain minimum temperature.

Membrane panels or sheets may be custom fabricated and may be offered in standard sizes. The material resiliency including flexibility may be designed into the product through varying the percentage of certain materials in the composite such as different percentages of rubber added to the composite.

Installing fixtures such as pipe brackets, solar panels, roof vents, air-conditioners, and other like accessories can be problematic after a membrane roof is installed, in that support structures designed to hold the fixtures in place are conventionally nailed or otherwise fastened to the roof over the membrane material, penetrating the membrane material at each anchor point. Although the penetrations may be small, nonetheless, roofing mastic, caulking, sealants, or a similar semi-viscous sealer is applied over the penetrations to seal them ensuring a leak proof or watertight roof system.

It has occurred to the inventor that such penetrations, although minor, have a collective negative effect on the long-term viability of the roofing system in protection against leakage. For example roofing mastic, caulking, sealants, roof putty or other after-market sealers do not last as long as the membrane materials of the roof systems and therefore periodic reapplication of such sealing products is often required to preserve the integrity of the system, or leaks are sure to occur. Many roof manufacturers provide leak free warrantees that cover labor and materials up to 30 years. Penetrations directly into the roof membrane can in certain instances void these warrantees.

Therefore, what is clearly needed is an apparatus for supporting fixtures on a membrane roof that altogether eliminates the need for penetrating the membrane roofing material.

BRIEF SUMMARY OF THE INVENTION

In one embodiment of the invention a method for supporting one or more fixtures on a membrane-covered roof is provided, comprising steps of (a) forming one or more brackets to interface with and secure the one or more fixtures, the one or more brackets coated each on at least one surface with a material compatible for heat welding to roofing membrane, (b) cutting a piece of roofing membrane, separate from the membrane of the membrane-covered roof, the cut piece of roofing membrane having a length and width substantially greater than dimensions of the one or more brackets, (c) joining the one or more brackets by heat welding to the cut piece of roofing membrane, leaving substantial overhanging projection of the cut piece of roofing membrane from the one or more bracket in every direction from the one or more brackets, and (d) heat welding the cut piece of roofing membrane to the membrane of the membrane-covered roof, thereby securing the one or more brackets to the membrane-covered roof.

In one embodiment the cut piece of roofing membrane is one of Polyvinyl Chloride (PVC), Ketone Ethylene Ester (KEE), Chloro-Sulfonated Polyethylene (CSPE), Ethylene Propylene Diene Monomer (EPDM), Thermoplastic PolyOlefin (TPO) or other membrane roofing material. Also in one embodiment the one or more brackets are fabricated of galvanized steel sheet metal pre-coated with material heat-weldable to the cut piece of roofing membrane. And in one embodiment the cut piece of membrane is from the material used in the membrane roofing.

DETAILED DESCRIPTION OF THE INVENTION

In various embodiments described in enabling detail herein, the inventor provides a unique apparatus and methods for supporting fixtures and utilities on a membrane roof system. The present invention is described using the following examples, which may describe more than one relevant embodiment falling within the scope of the invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented within the scope of the invention. The invention is limited only by the breadth of the claims below.

Figure 1:
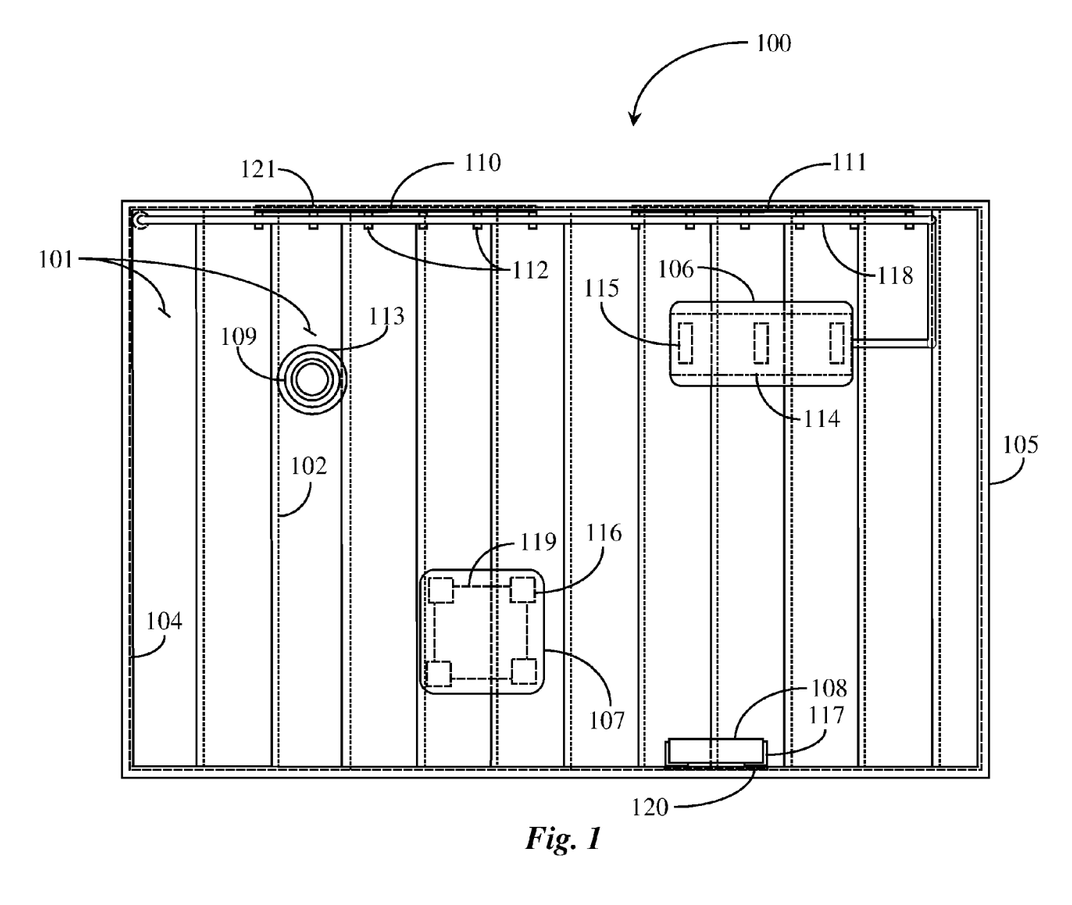
FIG. 1 is an overhead view of a membrane roof system supporting fixture installation according to an embodiment of the present invention.

FIG. 1 is an overhead view of a membrane roof system 100 supporting fixture installation according to an embodiment of the present invention. Roof system 100 may be formed of one of Polyvinyl Chloride (PVC), Ketone Ethylene Ester (KEE), Chloro-Sulfonated Polyethylene (CSPE), Ethylene Propylene Diene Monomer (EPDM) or Thermoplastic PolyOlefin (TPO) without departing from the spirit and scope of the present invention, or any other membrane material known in the art. Roof system 100 is laid over an unfinished roof surface using precut flexible roofing sheets 101.

The term membrane roughly refers to a flexible resilient roof made with a mixture of rubber and thermoplastic polymers. Such materials may be heat welded together to fuse the roofing sheets together presenting a leak proof covering. An important material in membrane roofing is thermoplastic PolyOlefin (TPO) in this example, however the present invention does not strictly depend on TPO for successful application. Therefore, other flexible or membrane type roofing materials may also be considered for heat weld such as Polyvinyl Chloride (PVC), Ketone Ethylene Ester (KEE), Chloro-Sulfonated Polyethylene (CSPE), or Ethylene Propylene Diene Monomer (EPDM).

Roofing sheets 101 are rolled out lengthwise and fastened (one edge) to the roof surface with subsequent sheets laid over the previous sheets to cover the fastening lines. The overlapping area of a sheet of membrane is heat welded over the fastening line (102) on the previous sheet installed to ensure watertight seal. In this example roof system 100 has a horizontal surface (floor) and four vertical surfaces (walls). Typically, wall or vertical covering is performed with the same material as the horizontal covering and wall sheets have adjacent edges overlapping and heat welded over the fastening lines of the edge panels or sheets on the horizontal surface or floor of the roof.

Roof system 100 in this example includes a number of fixtures that are installed and supported on both the horizontal roof surface and on at least two of the vertical surfaces. It is noted that a roof construction that may accept a membrane roof system may incorporate hips and valleys, sloped surfaces and non-flat surfaces, and other features without departing from the spirit and scope of the present invention. The apparatus may support fixtures installed on any of the surfaces of the roof.

In this example a fixture 107 is depicted on the horizontal roof surface after finishing (covering). Fixture 107 may be a heating/air conditioning unit for example. A fixture 106 is also depicted on the horizontal roof surface. Fixture 106 might be a solar system for providing electricity or for heating a pool, etc. A fixture 109 is depicted herein as a vent or flue. A fixture 108 is depicted as mounted on a vertical roof surface and might represent a fire extinguisher, an alarm, or some other utility. The opposing vertical roof surface supports fixture 118. Fixture 118 may be conduit, plumbing, cabling, etc. There are a great variety of such fixtures that may be necessary on a roof.

The fixtures in this example are held in place by one or more brackets. Brackets may be manufactured of galvanized steel (sheet metal) or other durable metals or suitable materials. Such brackets may be custom built for the type of fixture being mounted. In one example a support apparatus includes more than one bracket.

It may be desired to determine and mark areas on the roof where fixtures will be installed before laying out the membrane roofing materials over the unfinished roof. In this case it may be desired to provide extra support for some fixtures that are particularly heavy or may need extra support, such as on a vertical or sloped roof surface. In one embodiment such areas are marked and one or more pieces of roofing material are cut and fastened to the unfinished roof to provide underlying enhancement of adhesion to a roof before laying out the roofing sheets 101.

In this example a cut piece of roofing membrane material 119 is provided and stapled or otherwise secured directly to unfinished roof beneath where an A/C system (107) will later be installed. Sheets 101 are heat welded (overlapping bottom surfaces) to support piece 119 (top surface) as the membrane roof is installed. Locations 116 are locations for unique bracket assemblies that are fastened to the membrane roof as described in more detail below.

In this example there is another fixture 106 depicted as supported on roof system 100. Fixture 106 may be a solar power panel used to provide extra electricity or for heating pool water for example. Underneath roofing sheets 101 there is a cut piece of support membrane 114. As discussed above, this piece is directly attached to the unfinished roof with screw fastener or other fastening techniques in a marked location. Roofing sheets 101 are heat welded over the support pad (114) and overlapping areas of the sheets are heat welded together. Screw fastener may not be used in areas where the roofing sheet overlays a precut piece of membrane used as a base or pad. Instead the sheeting may be heat welded to the support piece so there are no penetrations to the exposed materials. Areas 115 are positions for unique brackets described below in another embodiment of the invention.

Fixture 106 has a conduit or pipe 118 connected to it. This conduit represents a water pipe, electrical conduit, or any other required tethering for successful operation of the fixture. Conduit 118 is supported partly on a vertical side of roofing system 100. In this case pre-assembled pieces 121 and 111 are attached to the unfinished roof surface as previously described. Then roofing sheets (vertical 104) are overlaid and heat welded to pieces 121 and 111. Bracket supporting strips 110 represent precut membrane strips that may host an array of brackets heat welded at strategic locations along the strip, as described in further detail below. In this case brackets 112 are vertically mounted conduit hangars of the appropriate dimension to support the diameter of the supported conduit 118.

Fixture 108 is also vertically mounted, the apparatus including fixture 108 installed on brackets 117 that are heat welded to membrane support piece 120. In this case there is no underlying support piece attached to the roof surface. Strip 117 with brackets 117 previously heat welded on to it is subsequently heat welded to the finished roof membrane surface after the roof is covered. In this case the fixture may be installed anywhere, as there was no pre-determined location on the unfinished roof marked to denote a location for the fixture. Similarly, vent fixture 109 may be coated on an interfacing flange and then heat welded to a support ring that is then heat welded to the top surface of the finished roof. If additional support is needed another support piece may be stapled or otherwise attached to the unfinished roof at the location or the vent. The overlying material is then heat welded to the support piece while the flange piece welded to the top support piece is then welded to the finished surface.

In this way all of the fixtures that need to be installed on a membrane roofing system may be secured without leaving any penetrations through the finished membrane roof. The exact cut sizes of support pieces and whether additional support pieces (underlying and surface) are required depend upon the fixture type, location of the fixture (horizontally or vertically mounted), the weight of the fixture, and the composition of the membrane materials used as support pieces. The mixture of the composite relative to the percentages of rubber, plastic, binders, and other materials may contribute to less or more resiliency and flexibility of the roofing material. For larger fixtures like utilities that have more weight, additional support membrane pieces may be provided and fixture location on the roof may be pre-designed. For lightweight fixtures such as conduit fixtures, light fixtures, etc., only a single support membrane piece might be required. In this case the fixture brackets are heat welded to the support piece, which is in turn heat welded over the finished roof surface.

Figure 2:
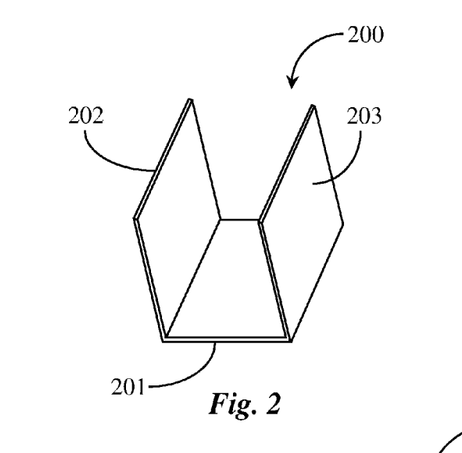
FIG. 2 is a perspective view of a fixture bracket with a membrane coating on an interfacing surface.

FIG. 2 is a perspective view of a fixture bracket 200 with a heat-weldable coating on an interfacing surface. Bracket 200 may be a standard sheet metal bracket such as a galvanized steel bracket sheared and bent to design for the type of fixture to be held in place. In this example, bracket 200 is a U-shaped bracket having a side 201, a side 202, and a side 203, and sized to fit standard 4×4 lumber. Other brackets may be made for other standard sizes of lumber, or other pieces of support structure. The thickness of bracket 200 might vary, however one sixteenth of an inch to one eight of an inch may be sufficient thickness for such brackets.

Bracket 200 has a coating 204 covering an outside surface of wall 203. An interfacing surface refers to the surface that will interface and be heat welded to a support piece of roof material. It is important to note that the requirement of heat welding is that the coating is thick enough to be heat welded to the surface of the support piece wherein the materials fuse to form a contiguous bond. Coating 204 may be relatively thin compared to the thickness of a support piece of roof material. The exact thickness of the bracket coating may vary depending upon the thickness of the roofing material. Also, it is noted that the two materials (sheeting) and (coating) must be compatible for a contiguous heat weld application. In one embodiment both the coating and the roofing material is thermoplastic olefin (TPO). In embodiments of the invention brackets are formed from commercially-available galvanized sheets already coated on one side with TPO or one of the other formulations mentioned above, depending on the formulation of the membrane used for the roof on which the brackets may be attached.

Figure 3A:
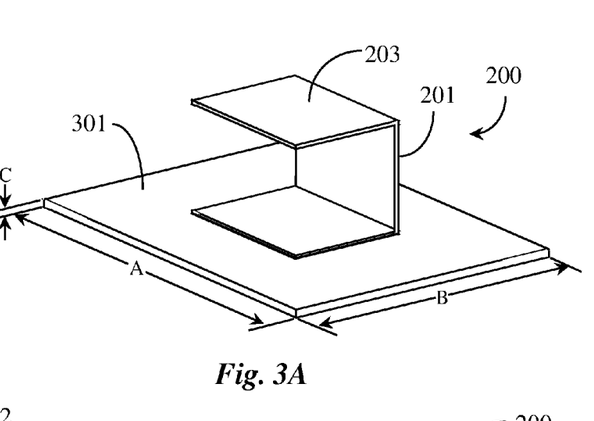
FIG. 3A is a perspective view of the bracket of FIG. 2 heat welded to a piece of membrane material at a first side.
Figure 3B:
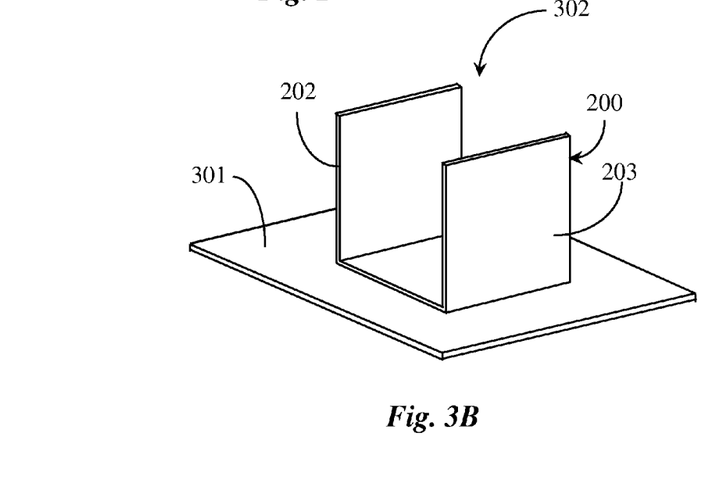
FIG. 3B is a perspective view of the bracket of FIG. 2 heat welded to a piece of membrane material at a second side.
Figure 3C:
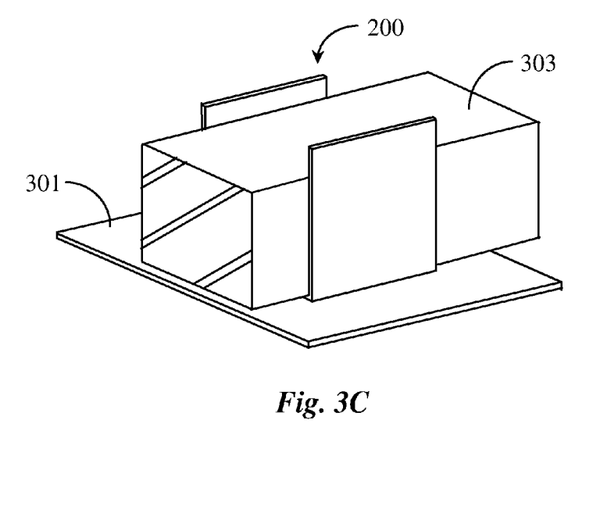
FIG. 3C is a perspective view of the bracket of FIG. 2 welded as in FIG. 3B having a wooden element held in the bracket.

FIG. 3A is a perspective view of bracket 200 of FIG. 2 heat welded to a piece of membrane material 301. Support piece 301 may be precut from roofing sheet material. In this configuration there is only a single bracket welded to a precut piece of roofing material. In other embodiments there may be an array of brackets heat welded to a single piece of membrane material. The length A and width B of piece 301 may vary according to fixture and bracket number requirements. Bracket 200 is shown heat welded to membrane piece 301 along side 203, but may as well be heat welded along side 201, facing open upward to receive a 4×4 beam, as shown in FIG. 3B. FIG. 3C illustrates the bracket welded as in FIG. 3B and having a wooden element 303 in place.

One piece of membrane material may support more than one and different types of brackets in a same assembly. The thickness C of piece 301 may be the same as or different from the thickness of the roofing membrane sheeting without departing from the spirit and scope of the invention. In a typical application support pieces may be cut from the same roofing materials used to cover the roof. Also, the length A and width B of piece 301 are sufficiently greater that the footprint of the bracket to allow for a lifting edges to be able to heat the underside of piece 301 and the membrane roofing to which it is being heat welded.

Figure 4:
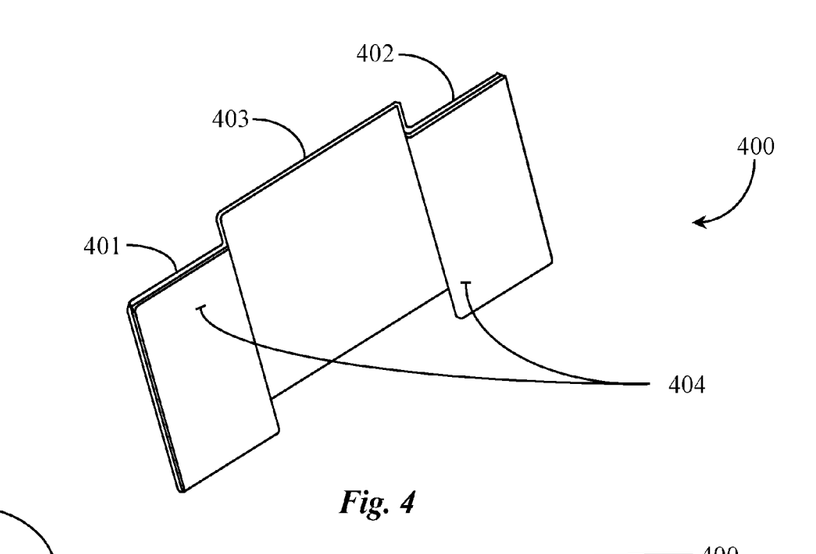
FIG. 4 is a perspective view of a fixture bracket with membrane coatings on two interfacing surfaces.

FIG. 4 is a perspective view of a fixture bracket 400, which is a low profile bracket that designed for holding a rail that may be slid in underneath two or more brackets in an array. Such rails are, for example, support for solar panels in some circumstances. Brackets 400 are in those example made from pre-treated galvanized sheets as described above. In this example, bracket 400 has two parallel tabs or wings (401, 402) lying in the same plane and a raised middle section 403. Bracket 400 with a number of similar brackets may be heat welded in an array to a long piece of membrane material, as shown, that may then be heat welded to the finished roof covering as depicted in FIG. 5 of this specification.

Figure 5:
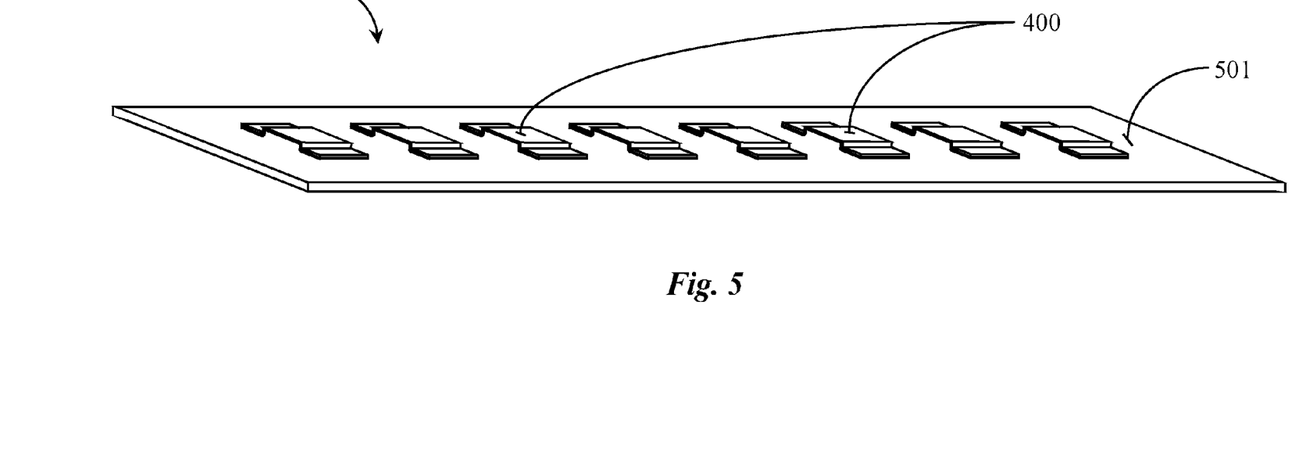
FIG. 5 is a perspective view of an array of the fixture brackets of FIG. 4 heat welded to a piece of membrane material.

FIG. 5 is a perspective view of an assembly 500 hosting an array of fixture brackets 400 heat welded to one long piece of membrane material 501. Assembly 500 comprises an array of low profile brackets 400 heat-welded in an array to membrane material 501. In this configuration, the brackets are designed to enclose a rail foot (not illustrated) of a solar panel apparatus or other roof top equipment. Sufficient membrane material 501 is used such that the assembly is flexible, and may be manipulated to efficiently heat weld to a membrane roof.

Support piece 501 may be cut from the roofing sheet and may be longer and considerably wider than the profile of the bracket array to allow for more heat weld surface. In an implementation such as this one, a user may slip a rail underneath the heat-welded brackets and then bolt the utility to the rail. There can be more than one of these support pieces, such as for a utility having two or more rails for example. Brackets may be provided in various differing configurations without departing from the spirit and scope of the invention.

In general implementation where more than one support piece of membrane material may be used, an installer may outline one or more footprint areas on an unfinished roof surface where fixtures are to be installed on the finished roof. The demarcations may be part of a drawing or blueprint with dimensions so they may again be located after the roofing material is laid out. At the outlined locations, the installer may fasten, such as by roof stapling, one or more than one precut membrane pieces to the unfinished roof prior to laying out the strips or rolls of membrane to form the membrane roof. The installer may then position and secure the roofing sheets over the unfinished roof and the added support pieces. The installer may use fasteners and heat welding to secure the membrane roof system over the unfinished roof.

It may be assumed that in one implementation the fixture brackets are formed from commercially-available metal sheets pre-coated with the membrane material. The installer may arrange the brackets and heat weld them to additional precut pieces of membrane. These support pieces may be heat welded to the finished roof at demarked support locations where underlying support pieces exist or at any location desired if an underlying support is not required for the type of and weight of the fixture. The installer then fastens the fixtures to the brackets.

Reasons for adding underlying support may vary according to the angle of roof surface and the type and weight of the supported fixture or utility. For example, something heavy on a horizontal surface or vertical surface may need extra support. Very lightweight fixtures such as conduit hangars for example might be installed anywhere on the finished roof as needed. In one implementation certain lightweight fixtures may be packaged with brackets already heat welded to cut membrane pieces that are compatible with (can be heat welded to) the standard roofing materials. In this case users may add aftermarket fixtures to upgrade lighting or other features on the roof. The heat welding process itself is known in the art and available for use in fusing the materials together in a secure and leak proof fashion.

Figure 6:
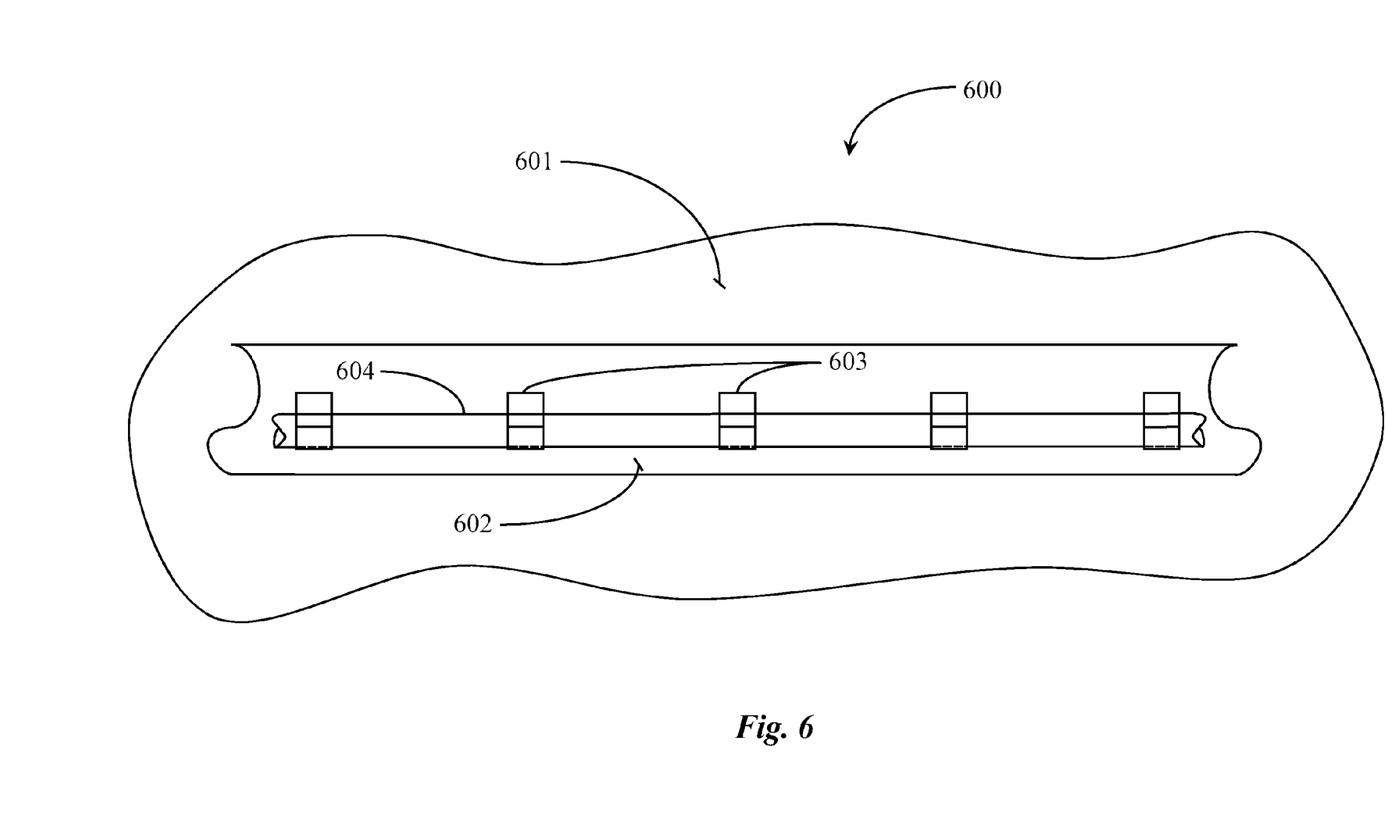
FIG. 6 is an expanded view of a vertically mounted conduit support structure according to an embodiment of the present invention.

FIG. 6 is an expanded view of a vertically mountable conduit support structure 600 according to an embodiment of the present invention. Structure 600 has a number of conduit support hangars (brackets) 603 that are designed to hold conduit on a vertical surface. Brackets 603 are formed, as described before, from commercially-available metal sheet pre-coated with compatible membrane material. Several brackets 603 are depicted as heat welded to a piece of precut membrane material 602.

The support apparatus (brackets heat welded to material) is heat welded to a finished vertical roof surface. Piece 602 may be as long as is required to span the length of the conduit to be mounted on the roof surface. In some implementation such as one depicted in the illustration of FIG. 1, two or more standard length support pieces (each hosting several conduit hangars) might be used collectively to hang the conduit. Many other fixture types may be installed to the finished membrane roof using the method of the present invention.

Figure 7:
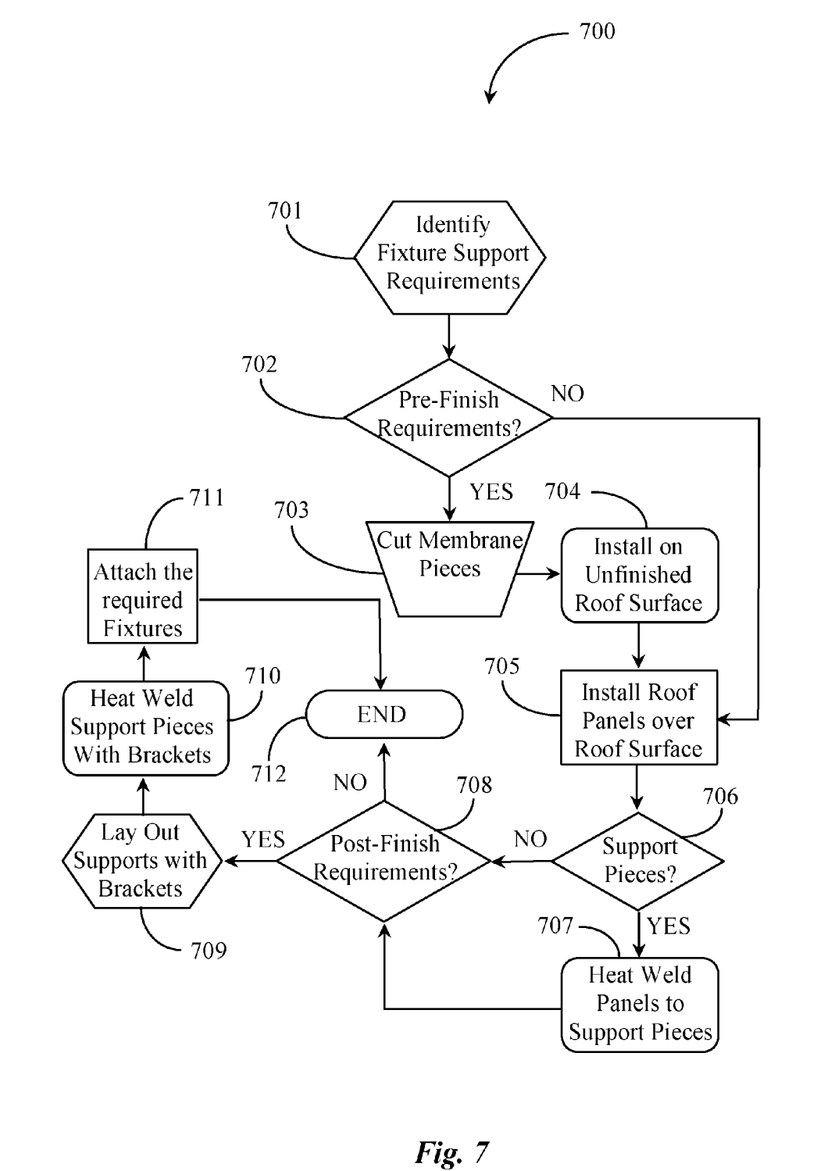
FIG. 7 is a process flow chart depicting steps for preparing a membrane roof system for fixture support or attachment according to aspects of the present invention.

FIG. 7 is a process flow chart 700 depicting steps for preparing a membrane roof system according to aspects of the present invention. In act 701 requirements are identified before roofing is applied to an unfinished roof. In this step the types of fixtures are identified and whether they need to be installed in certain areas on the roof, etc.

At step 702 it is determined if there are any pre-finish requirements relative to any of the fixtures identified in step 701. If there are pre-finish requirements at step 701 then the installer may precut pieces of the membrane sheeting material as required in step 703 to make the underlying membrane support areas. Any underlying pieces may be stapled or otherwise fastened to the unfinished roof at step 704. Underlying membrane support pieces may be installed on any angle of surface from horizontal to vertical.

If it is determined that there are no pre-finish requirements at step 702, the process may skip over to step 705 where the roof installation takes place. Likewise, conventional fasteners may be used to fasten one side of a roof sheet to the roof. Adjacent roofing sheets or panels are heat welded to the installed panels so only one side of a roofing sheet has to be fastened to the unfinished roof. An unfastened edge of a membrane roofing sheet is heat welded over a fastened edge of the previously installed sheet. The opposite edge of the heat-welded sheet may then be fastened to the unfinished roof.

At step 706 it is determined if there were support pieces attached to the roof as per step 704. If it is determined that there are pre-finish membrane support pieces on the roof the installer heat welds the roofing sheets to those support pieces wherever they occur in step 707. From either step 707 or step 706 in case of "no", it is determined whether there are any post-finish requirements (fixtures not requiring pre-finish support pieces) for attaching fixtures.

If it is determined that there are no post-finish requirements at step 708, then the process may end at step 711. If it is determined that there are post-finish requirements at step 708 the installer may lay out precut support pieces with the appropriate brackets heat-welded to those pieces at step 709. It may be assumed that the brackets are already heat-welded to the precut membrane pieces in the correct orientation to mount or otherwise connect the fixtures to the brackets. If this is not the case, additional steps for orientating the brackets and heat welding them to the pre-cut membrane support pieces may be required. For pieces containing multiple brackets, jigs or fixtures might be provided to help orientate those brackets for heat welding.

At step 710 the installer heat-welds the support pieces with the brackets attached to the finished roof at the pre-planned or desired locations. Fixture attachment to the brackets may also be performed at step 711 after the support pieces are finished and attached to the finished roof. The process may then end at step 712.

It will be apparent to one with skill in the art that the system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

The invention claimed is:

1. A method for supporting one or more fixtures on a membrane-covered roof, comprising steps:
  (a) forming one or more brackets to interface with and secure the one or more fixtures, the one or more brackets coated each on at least one surface with a material compatible for heat welding to roofing membrane;
  (b) cutting a piece of roofing membrane, separate from membrane of the membrane-covered roof, the cut piece of roofing membrane having a length and width substantially greater than dimensions of the one or more brackets;
  (c) joining the one or more brackets by heat welding to the cut piece of roofing membrane, leaving substantial overhanging projection of the cut piece of roofing membrane from the one or more bracket in every direction from the one or more brackets; and
  (d) heat welding the cut piece of roofing membrane to the membrane of the membrane-covered roof, thereby securing the one or more brackets to the membrane-covered roof.

2. The method of claim 1 wherein the cut piece of roofing membrane is one of Polyvinyl Chloride (PVC), Ketone Ethylene Ester (KEE), Chloro-Sulfonated Polyethylene (CSPE), Ethylene Propylene Diene Monomer (EPDM), Thermoplastic PolyOlefin (TPO) or other membrane roofing material.

3. The method of claim 1 wherein the one or more brackets are fabricated of galvanized steel sheet metal pre-coated with material heat-weldable to the cut piece of roofing membrane.

4. The method of claim 1 wherein the cut piece of membrane is from the material used in the membrane roofing.

5. A method for supporting one or more fixtures on a membrane-covered roof, the fixture having a number of fastener elements in a pattern for mounting the fixture to a surface, comprising steps:
  (a) forming a plurality of brackets equal to the number of fastener elements, to interface with and secure the one or more fixtures, the plurality of brackets coated each on at least one surface with a material compatible for heat welding to roofing membrane;

(b) cutting a piece of roofing membrane, separate from membrane of the membrane-covered roof, the cut piece of roofing membrane having a length and width substantially greater than dimensions of the pattern;
(c) joining the plurality of brackets in the pattern by heat welding to the cut piece of roofing membrane, leaving substantial overhanging projection of the cut piece of roofing membrane from the plurality of brackets in every direction from the plurality of brackets; and
(d) heat welding the cut piece of roofing membrane to the membrane of the membrane-covered roof, thereby providing a pattern of brackets for mounting the fixture to the membrane-covered roof.

\* \* \* \* \*